July 6, 1954 H. D. COE, JR., ET AL Re. 23,846

MEANS FOR FINISHING WORKPIECES OF IRREGULAR SHAPES

Original Filed Nov. 26, 1948

WITNESSES:

H. F. Susan.

Mw. le Groome

INVENTORS
Harry D. Coe, Jr. and
Joseph B. Dym.

BY C. M. Avery
ATTORNEY

Reissued July 6, 1954

Re. 23,846

UNITED STATES PATENT OFFICE 23,846

MEANS FOR FINISHING WORKPIECES OF IRREGULAR SHAPES

Harry D. Coe, Jr., and Joseph B. Dym, Pittsburgh, Pa.; said Dym assignor to said Coe, Jr.

Original No. 2,575,656, dated November 20, 1951, Serial No. 62,102, November 26, 1948. Application for reissue October 22, 1952, Serial No. 316,331

7 Claims. (Cl. 51—141)

Figure 1:
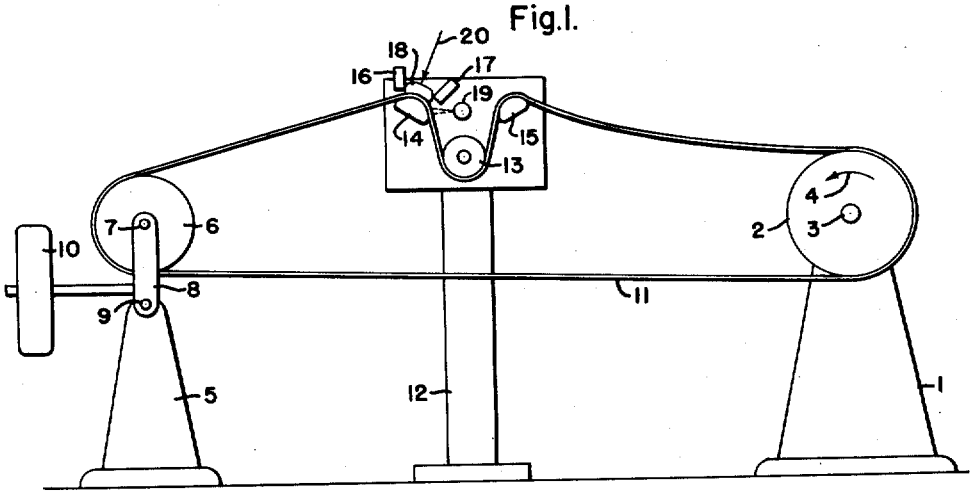

Matter enclosed in heavy brackets [ ] appears in the original patent but forms no part of this reissue specification; matter printed in italics indicates the additions made by reissue.

Our invention relates to [method and] means for grinding, sanding, polishing or otherwise finishing irregularly shaped surfaces of workpieces such as turbine blades, hardware, streamlined appliance parts, cams, etc.

In the manufacture of irregularly shaped bodies it has been a problem to accurately obtain the desired or theoretically correct surface. For instance, with turbine blades of irregular contour, the conventional practice has been to forge or cast the material as close as possible to the desired shape and then improve the finish and correct the shape by hand polishing. The blades are alternately held against an abrasive polishing wheel and checked against profile gages at three points until the desired shape is obtained. This method is not only time consuming, but the attainable accuracy depends only upon the skill and judgment of the operator.

It is an object of our invention to provide methods and means that afford bringing irregular bodies into the desired shape with any desired degree of accuracy and in considerably less time than heretofore required.

Another object of the invention is to greatly reduce the skill required for obtaining accurately finished surfaces and to render the accuracy uniform over the whole finished surface. These and other objects of our invention will be apparent from the following description.

In accordance with the [invented method] *invention* we provide a rigid form block or matrix with an irregular matrix suface that substantially matches the irregular surface to be finished, and we run an abrasive belt with its smooth side over the form block while keeping the belt slack. We further hold the workpiece to be finished on the abrasive side of the running belt against the matrix surface of the form block so that, due to the slackness of the belt, the belt adapts itself to the irregular matrix surface. In this manner, the workpiece can be accurately finished merely by holding or forcing it toward the formpiece without requiring special skill and within a period of only a small fraction of the time necessary for the above-mentioned conventional method.

If the workpiece surface is deeply concave, the belt is run directly over a correspondingly convex form block with the abrasive side out and so guided that it approaches and leaves the block approximately tangential to the surface at the first and last points of contact respectively. If the surface of the form block or workpiece is sufficiently conical to give the belt the tendency to run off the form block, an auxiliary form block of similar shape is provided in reversed relation to the active form block to correct this tendency.

If the surface to be finished is convex or a combination of concave and convex, the abrasive belt is run with no initial, or no appreciable tension and enough slack to adapt itself to the concave matrix surface area of the form block. The larger degree of slack thus required may make it difficult to drive the abrasive belt with belt wheels in the ordinary manner. However, the belt can then be forced against the belt wheels to secure the necessary traction. One way of doing this is to use vacuum on the belt wheels to suck and hold the running abrasive belt against the wheels. This vacuum method may lead to objectionable noise. According to another and preferred procedure, we run a drive belt together with the abrasive belt over the wheels and keep both belts in face-to-face contact over a sufficient length to secure the needed traction so that a portion of the abrasive belt can then run free and slack.

Figure 2:
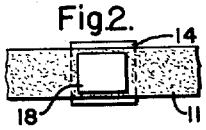
Figure 3:
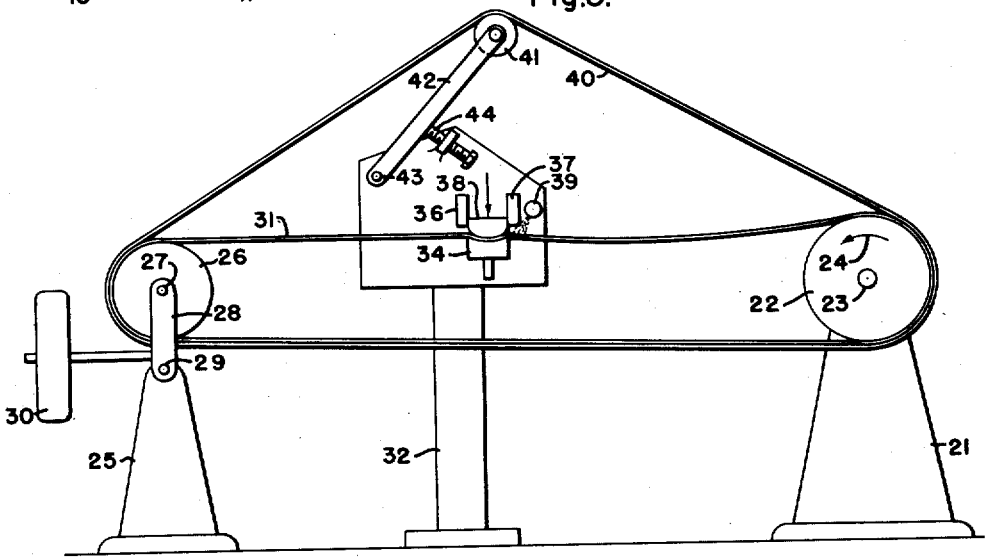

The above-mentioned [methods] *invention* as well as examples of devices suitable for [performing] *carrying out* these [methods] *inventions* will be understood from the following description of the embodiments illustrated in the drawing, in which:

Figure 1 shows diagrammatically a machine for finishing turbine blades or other workpieces with deeply concave surfaces, Fig. 2 shows a top view of the workpiece, abrasive belt and form block of the same machine; and Fig. 3 is a diagrammatic illustration of another machine especially designed for finishing [convex] *a concave or* a slightly convex surface.

The machine illustrated by Figures 1 and 2 is equipped with a drivestand 1 for a belt driving wheel 2 whose shaft 3 has bearings rigidly mounted on the stand. The running direction of the driving wheel 2 is indicated by an arrow 4. A backstand 5 of the machine is equipped with an idler wheel 6 whose shaft 7 is journalled in a link structure 8 pivoted at 9 to the stand 5. The link structure 8 is biased by a weight 10 and tends to move the idle wheel away from the driving wheel, thus maintaining the abrasive belt 11 in sufficiently taut condition to secure the necessary traction while permitting the belt to yield and become slack at the place of the form block described presently.

A workstand 12 located between a drivestand and backstand carries a belt guiding wheel 13 and a form block or matrix 14. The form block is rigidly attached to the workstand. Its matrix surface has an irregular shape in order to permit finishing the correspondingly irregular surface of a turbine blade or other workpiece in accordance with the above-described method. The machine, according to Fig. 1 is especially designed for finishing workpieces with deeply concave surfaces. In the illustrated embodiment, this surface is assumed to be generally conical so that the form block 14 may cause the abrasive belt 11 to run off the matrix surface. In order to prevent this, an auxiliary or compensating form block 15 is also mounted on the workstand. The compensating form block has about the same shape as the main form block 14, but is arranged in the reverse direction, i. e., the tapering side of its surface points to the other side of the belt and hence compensates for the tendency of the belt to run off the form block 14.

Two guides 16 and 17 are provided in order to facilitate placing the workpiece 18 in the proper position on the abrasive side of the belt. When the belt is running and the workpiece 18 held on the abrasive belt side against the matrix surface of the form block 14, the belt assumes sufficient slackness between the driving wheel and the form block to permit the belt portion at the matrix surface to adapt itself to that surface. As a result, the workpiece surface is finished with the desired accurate shape without requiring special skill and within a period of time much shorter than otherwise required. A water spray nozzle is denoted by 19 and an arrow 20 indicates the feeding direction for the workpiece 18. The arrangement of the form block 14 is preferably such that the belt 11 approaches and leaves the block approximately tangential to the matrix and workpiece surface at the first and last point of contact respectively.

The machine illustrated in Fig. 3 has a drive-stand 21 for the driving wheel 22. As in the machine of Fig. 1, the bearings for the wheel shaft 23 are rigidly mounted on the stand. The driving direction of the wheel is indicated by an arrow 24. A backstand 25 carries an idler wheel 26. The shaft 27 is journalled in a structure 28 that is pivoted at 29 to the stand 25 and biased by a weight 30. The abrasive belt 31 which extends around the drive wheel 22 and idler wheel 26 passes over the matrix surface of a convex form block 34, which is mounted on a workstand 32. The workstand 32 is also equipped with guides 36 and 37 for the workpiece 38 and with a water spray nozzle 39. In order to permit the belt to adapt itself closely to the concave matrix surface while running over the form block, a larger amount of yielding or slackness is required than with convex matrix surface. Consequently, the traction of the driving wheel may become insufficient to pull the belt over the form block when the workpiece is fed against the block. In order to secure the necessary traction, the machine according to Fig. 3 is equipped with an auxiliary rubber belt 40. This belt is endless like the abrasive belt, but has greater length so that it lies in face-to-face relation with the abrasive belt on only one side of the wheels but is spaced from the abrasive belt at the other side. In order to maintain the proper spacing and for keeping the auxiliary traction belt in taut condition, a pressure roller 41 engages the belt 40. The roller 41 is journalled on an arm 42 pivoted at 43 to the workstand 32 and secured in the desired position by means of an adjusting screw 44.

When the machine is in operation and the workpiece 38 held on the abrasive side of belt 31 against the form block 34, the belt portion between the driving wheel 22 and the form block 34 can run with any suitable degree of slackness without reducing the traction below the required amount.

Methods and means, according to the invention, are applicable with advantage for the finishing of a large variety of irregular surfaces, i. e., of surfaces that are neither plane nor straight cylindrical or straight conical and hence cannot readily be shaped by conventional turning, shaping and grinding devices. Aside from the fact that the invention secures a high accuracy and requires less skill, the fabricating method used for bringing the workpiece surface into approximately the desired shape before finishing need not be so closely controlled as is necessary in the conventional procedure, thus lowering the amount of rejects and further reducing the finishing cost. For example, in machines built and operated according to the invention for finishing gas turbine blades, the overall savings afforded by the invention in comparison with the conventional methods amounted to approximately 80%.

The invention also affords a very simple method of forming and redressing the matrix blocks. For such purposes, it is merely necessary to reverse the belt so that its abrasive side runs over the matrix block to be finished or redressed, and to hold a master workpiece on the smooth belt side against the matrix block.

It will be obvious to those skilled in the art after a study of the present disclosure, that devices according to the invention can be modified as respects various design details and components without departing from the essence and features of our invention and within the scope of the claims annexed hereto.

We claim as our invention:

[1. A device for finishing a workpiece of irregular shape, comprising two initially spaced belt wheels, an endless abrasive belt having a smooth inner surface and an abrasive outer surface and extending around said two wheels, an endless drive belt extending around said two wheels, said drive belt having a portion extending from one to the other wheel in face-to-face engagement with said abrasive belt and having another portion spaced from said abrasive belt, and a form block disposed between said wheels at a place where said driving belt is spaced from said abrasive belt, said form block having a matrix surface substantially matching the surface to be finished and engageable by said inner surface of said abrasive belt when a workpiece is held on the outer side of said abrasive belt against said block.]

[2. A device for finishing a workpiece of irregular shape, comprising two mutually spaced belt wheels, an endless abrasive belt having a smooth inner surface and an abrasive outer surface and surrounding said two wheels, an endless drive belt having larger length than said abrasive belt and surrounding said wheels and said abrasive belt, tautening means engaging said drive belt to maintain it spaced from said abrasive belt at one side of said wheels and in contact with said abrasive surface of the other side of said wheels, a form block having a matrix surface substantially matching the surface to be finished and being engageable by said abrasive surface of said abrasive belt and disposed at a place where said drive belt is spaced from said abrasive belt.]

[3. In a device according to claim 2, one of said wheels having a drive shaft and a stationary axis, said other wheel having an idler shaft movable toward and away from said drive shaft, and biasing means connected with said idler shaft for biasing it away from said drive shaft.]

[4. A device for finishing a workpiece of irregular shape, comprising two mutually spaced belt wheels, an endless abrasive belt having a smooth inner surface and an abrasive outer surface and surrounding said two wheels, an endless drive belt having larger length than said abrasive belt and surrounding said wheels and said abrasive belt, tautening means engaging said drive belt to maintain it spaced from said abrasive belt at one side of said wheels and in contact with said abrasive surface of the other side of said wheels, and a supporting block having a surface engaged by the inner side of said abrasive belt and being disposed within said abrasive belt at the belt side where said drive belt is spaced from said abrasive belt.]

*5. A device for finishing a workpiece of irregular shape, comprising two wheels, mounting means for each of said wheels for mounting said wheels in spaced relationship, each wheel rotatable about its axis relative to its mounting means, means for supporting the mounting means for one wheel movable relative to the other mounting means so that the axis of said one wheel may be moved relative to the axis of the other wheel, an endless abrasive belt having an abrasive surface and extending around said two wheels, an endless drive belt having a portion extending from one to the other wheel in face-to-face engagement with said abrasive belt and having another portion spaced from said abrasive belt, said driving belt exerting a force on said movable mounting means tending to urge said axis of said movable wheel toward the axis of said other wheel, means associated with said movable mounting means tending to counteract said force, means cooperative with said driving belt for setting said wheels at a predetermined distance from each other, and a form block disposed between said wheels at a place where said driving belt is spaced from said abrasive belt, said form block having a matrix surface substantially conforming with the surface to be finished in male and female relationship and engageable by one surface of said abrasive belt when a workpiece is held against the other surface of said abrasive belt.*

*6. A device for finishing a workpiece of irregular shape, comprising two belt wheels, mounting means for each of said wheels for mounting said wheels mutually spaced, each rotatable about its axis relative to its mounting means, an endless abrasive belt having at least one abrasive surface and surrounding said two wheels, an endless drive belt in driving engagement with said abrasive belt, said abrasive belt being disposed between said drive belt and said wheels, tautening means engaging said drive belt to maintain it spaced from said abrasive belt on at least one side of said wheels and a form block having a matrix surface substantially conforming with the surface to be finished in male and female relationship and being engageable by said abrasive belt and disposed at a place where said drive belt is spaced from said abrasive belt.*

*7. In a device according to claim 6, the mounting means of one of said wheels having a drive shaft for said one wheel and a stationary axis, the mounting means of said other wheel having an idler shaft movable toward and away from said drive shaft, and biasing means connected with said idler shaft for biasing it away from said drive shaft.*

*8. A device for finishing a workpiece of irregular shape, comprising two belt wheels, mounting means for each of said wheels for mounting said wheels in mutually spaced relationship, each wheel rotatable about its axis relative to its mounting means, an endless abrasive belt having at least one abrasive surface and surrounding said two wheels, an endless drive belt in driving engagement with said abrasive belt, said abrasive belt being disposed between said wheels and said drive belt, tautening means engaging said drive belt to maintain it spaced from said abrasive belt on at least one side of said wheels and a supporting block having a surface engaged by one surface of said abrasive belt and being disposed adjacent said abrasive belt on the side of said abrasive belt where said drive belt is spaced from said abrasive belt.*

*9. Apparatus for finishing the surface of a workpiece of irregular shape comprising in combination means for mounting said workpiece with said surface in grinding position, a first wheel adjacent said mounting means, a support for said first wheel for supporting said first wheel rotatable about its axis, mounting means for said support for mounting said support movable so that the axis about which said wheel rotates is displaceable, a second wheel adjacent said workpiece mounting means, a support for said second wheel, an abrasive belt operatively engaging said wheels and adapted to move in grinding engagement with said surface, a second belt operatively engaging said abrasive belt over at least portions of those portions of said abrasive belt which engage said wheels, and holding said abrasive between said second belt and said wheels, means cooperative with said second belt for driving said abrasive belt, and means for positioning said first wheel by movement of its support to obtain a predetermined amount of slackness in said abrasive belt.*

*10. In combination a first wheel; a second wheel; a first support into which said first wheel is journaled to rotate about its axis; a second support into which said second wheel is journaled to rotate about its axis, mounting means for one of said supports for mounting said one support movable so as to displace the axis of the wheel mounted on said one support; an abrasive belt in operative engagement with said wheels; a second belt in operative engagement with said abrasive belt over at least portions of those portions of said abrasive belt which engage said wheels and holding said abrasive belt between said second belt and said wheels; means cooperative with said second belt for driving said abrasive belt; and means cooperative with said support mounting means for varying relatively the lengths of the sections of said second belt which extend between the regions of engagement of said second belt and said abrasive belt.*

*11. Apparatus for finishing the surface of a workpiece, said surface having a high degree of curvature comprising in combination means for mounting said workpiece in grinding position, a wheel, a support on which said wheel is journaled to rotate about its axis, mounting means for said support for mounting said support movable so as to displace said axis, an abrasive belt, means for positioning said belt in operative engagement*

*with said wheel and in continuous grinding engagement with said entire surface of said workpiece, a second belt operatively engaging said abrasive belt over at least a portion of that portion of said abrasive belt which engages said wheel and holding said abrasive belt between said second belt and said wheel, means cooperative with said second belt for driving said abrasive belt and means cooperative with said second belt for positioning said wheel by movement of its support with its axis so displaced as to obtain an amount of slackness in said abrasive belt adequate to conform said abrasive belt with said surface having a high degree of curvature.*

References Cited in the file of this patent or the original patent

UNITED STATES PATENTS

| Number | Name | Date |
|---|---|---|
| 552,066 | Leach | Dec. 24, 1895 |
| 645,717 | Fletcher | Mar. 20, 1900 |
| 1,000,296 | Sagerdahl | Aug. 8, 1911 |
| 1,160,099 | McNalley | Nov. 9, 1915 |
| 1,288,908 | Johnson | Dec. 24, 1918 |
| 1,434,334 | Freeman | Oct. 31, 1922 |
| 2,296,990 | Fowler | Sept. 29, 1942 |
| 2,334,960 | Roth et al. | Nov. 23, 1943 |
| 2,376,847 | Glike | May 22, 1945 |
| 2,453,972 | Clave et al. | Nov. 16, 1948 |
| 2,575,656 | Coe et al. | Nov. 20, 1951 |

FOREIGN PATENTS

| Number | Country | Date |
|---|---|---|
| 128,321 | Germany | Feb. 12, 1901 |